United States Patent [19]

Chalmers et al.

[11] 4,004,203
[45] Jan. 18, 1977

[54] DRIVE SYSTEMS USING A. C. MOTORS

[75] Inventors: Brian John Chalmers, Bramhall; John Phillip Gibson, Longsight, both of England

[73] Assignee: C.A.V. Limited, Birmingham, England

[22] Filed: Dec. 17, 1974

[21] Appl. No.: 533,526

[30] Foreign Application Priority Data

Dec. 22, 1973 United Kingdom ............ 59678/73

[52] U.S. Cl. ............................. 318/171; 318/187; 318/192

[51] Int. Cl.² ........................................... H02P 5/34

[58] Field of Search ... 318/138, 171, 187, 190–193, 318/227, 254; 321/5, 45 C

[56] References Cited

UNITED STATES PATENTS

| | | | |
|---|---|---|---|
| 3,612,970 | 10/1971 | Sofan | 318/171 X |
| 3,656,047 | 4/1972 | Yarema et al. | 321/45 C X |
| 3,667,014 | 5/1972 | Merhof et al. | 318/193 X |
| 3,749,991 | 7/1973 | Kuniyoshi | 318/171 X |
| 3,763,417 | 10/1973 | Johnston | 321/45 C X |

Primary Examiner—Gene Z. Rubinson

[57] ABSTRACT

A drive system comprises a brushless multi-phase motor which is supplied with power by way of an inverter including thyristors which are fired by a firing network. The firing network is supplied with information relative to the position of the rotor of the motor, by means of a transducer and this information flows by way of a logic network. Also provided is a current sensing device, a signal from which is passed through a control network to the logic circuit, and the logic circuit acts to modify the signals applied to the inverter in the event that the current flowing in one of the d.c. supply lines to the inverter exceeds a predetermined value for more than a predetermined length of time.

7 Claims, 17 Drawing Figures

DRIVE SYSTEMS USING A. C. MOTORS

This invention relates to drive systems using a.c. motors, and is particularly, but not exclusively, applicable to vehicle traction systems.

A system according to the invention comprises in combination an a.c. synchronous drive motor and an inverter providing power to the motor, the inverter receiving firing pulses under the control of the rotor of the motor, and the inverter being capable of operating from a maximum frequency down to zero frequency, so that the motor operates synchronously from starting up to maximum speed.

Preferably, the motor is a brushless motor.

Preferably, means is provided for limiting the d.c. input current to the inverter.

In the accompanying drawings,

FIG. 1 is a circuit diagram illustrating an inverter used in one example of the invention, FIG. 2 illustrates the firing pulses applied to thyristors in FIG. 1, FIG. 3 illustrates one form of firing control circuit, FIGS. 4 and 5 illustrate parts of FIG. 1, FIGS. 6 to 8 illustrate possible waveforms within FIG. 1, FIG. 9 illustrates another part of the firing control circuit, FIG. 10 is a block diagram of a traction system, FIG. 11 is a circuit diagram illustrating the preferred motor circuit, FIG. 12 illustrates one form of oscillator for use in FIG. 11.

Figure 10:
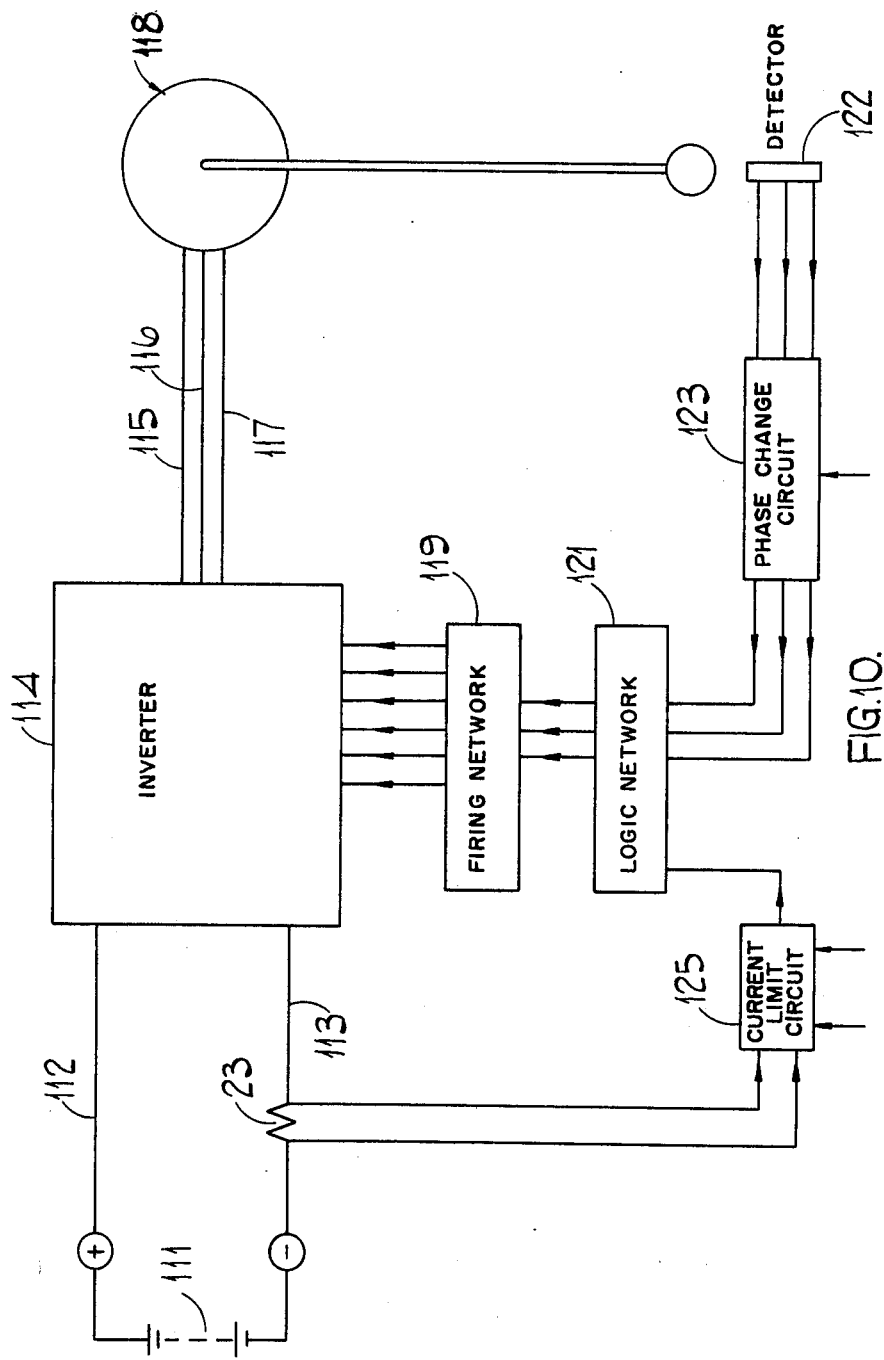

Referring first to FIG. 10, a battery 111 provides power to positive and negative lines 112, 113 feeding a three phase inverter 114. The inverter provides a.c. on three lines 115, 116, 117 connected to the phases of a brushless a.c. synchronous motor 118. The inverter 114 is controlled by a firing network 119 which in turn is controlled by a logic network 121. The position of the rotor of the motor 118 at any given moment is sensed by a detector 122 which provides three inputs to a phase change circuit 123 which controls the logic network 121. The arrangement is such that the motor 118 and inverter 114 are synchronised at all speeds from zero to a maximum frequency. This is made possible by designing the inverter 114 so that it is capable of reliable commutation from zero frequency upwards. Also, to cater for the high currents that can flow in the inverter at very low frequencies, that is to say at low motor speeds, the input current to the inverter 114 is restricted. As shown in FIG. 10, this is achieved using a current sensing device 23 in the line 113, this device providing an input to a current limit circuit 125 which, when the current flowing in the line 113 exceeds a predetermined value, modifies the action of the logic network 121 for a predetermined time during which the input current to the inverter is limited.

Figure 1:
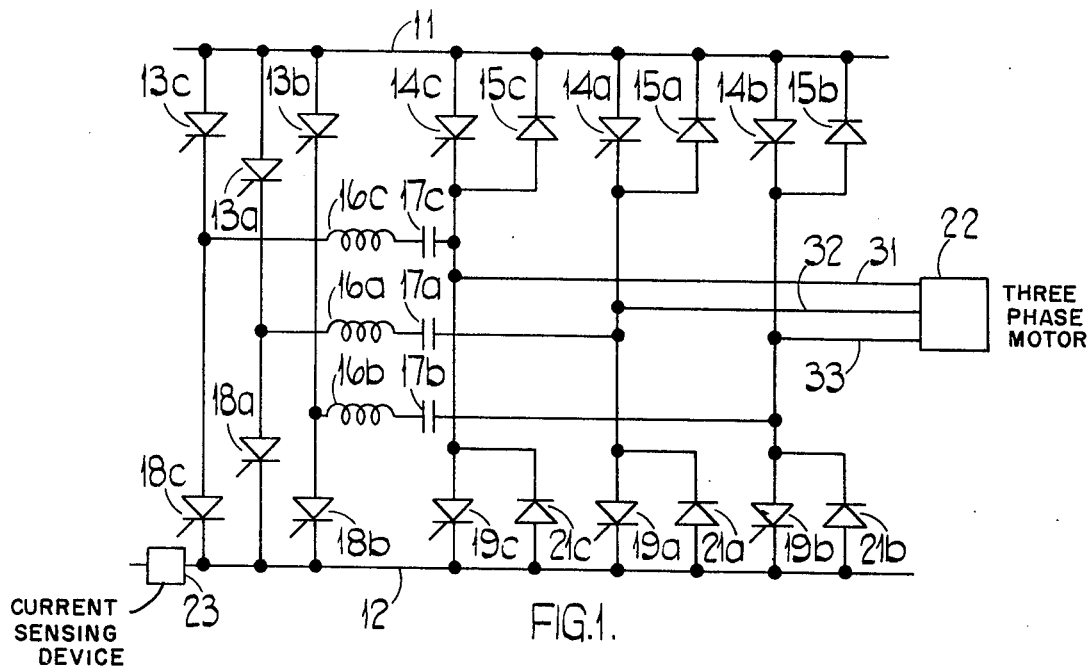

Considering now the circuit in more detail, and referring to FIG. 1, there are provided positive and negative supply lines 11, 12 connected to the battery 111. Connected to the supply line 11 are the anodes of a pair of thyristors 13a, 14a, the cathode of the thyristor 14a being connected to the line 11 through the anode-cathode path of a diode 15a. The cathodes of the thyristors 13a, 14a are interconnected through an inductor 16a and a capacitor 17a in series, and are further connected to the anodes of a pair of thyristors 18a, 19a having their cathodes connected to the line 12. The anode of the thyristor 19a is connected to the line 12 through the cathode-anode path of a diode 21a, and the anode of the thyristor 19 provides one input to a three phase motor 22. Additionally, conventional suppressors may be employed to limit the rate of rise of current and/or voltage at various points in the inverter.

The components thus far described are duplicated for the other two phases, and are indicated by the same reference numerals with suffixes $b$ and $c$ respectively for the other two phases.

Figure 2:
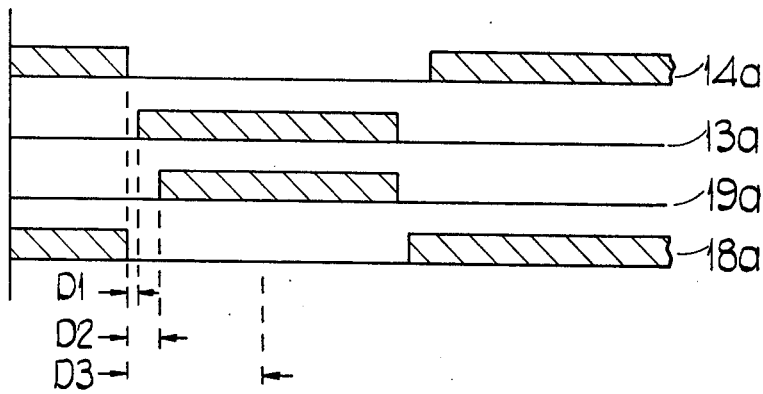

FIG. 2 shows the gating arrangements for the four thyristors in one of the phases. The gate signals applied to the thyristors can be d.c. signals or they can consist of a train of pulses. Where a train of pulses is used, then preferably the first pulse in the train has a greater amplitude and/or pulse length than the remaining pulses. It will be seen that at a given point in the cycle of one phase, gate current is supplied to the thyristors 14a and 18a so that the capacitor 17a is charged with its right-hand plate positive. Gate current is terminated through the thyristors 14a, 18a and after a short delay D1 the thyristor 13a is fired, causing the capacitor 17a to commutate the thyristor 14a. After a total delay D2 which is greater than D1, the thyristor 19a is fired and since the thyristors 13a and 19a are now both conducting, the capacitor 17a is charged with its left-hand plate positive. Later in the cycle, the gate current is removed from the thyristors 13a and 19a and then after another short delay D1 the thyristor 18a is fired, followed by firing of the thyristor 14a and so on. There is a further delay D3 during which the thyristors 18a and 14a are inhibited from firing pulses, so that two commutations cannot take place too close together.

The operation of the other two phases is similar, but of course the firing pulses for the various circuits overlap. The detector 122 produces output pulses in three trains, one train for each phase. A typical arrangement is shown in the following Table.

| SHAFT ANGLE | 0° | 60° | 120° | 180° | 240° | 300° | 360°(0°) |
|---|---|---|---|---|---|---|---|
| PHASE A | 1 | 1 | 1 | 0 | 0 | 0 | |
| PHASE B | 0 | 0 | 1 | 1 | 1 | 0 | |
| PHASE C | 1 | 0 | 0 | 0 | 1 | 1 | |

Figure 3:
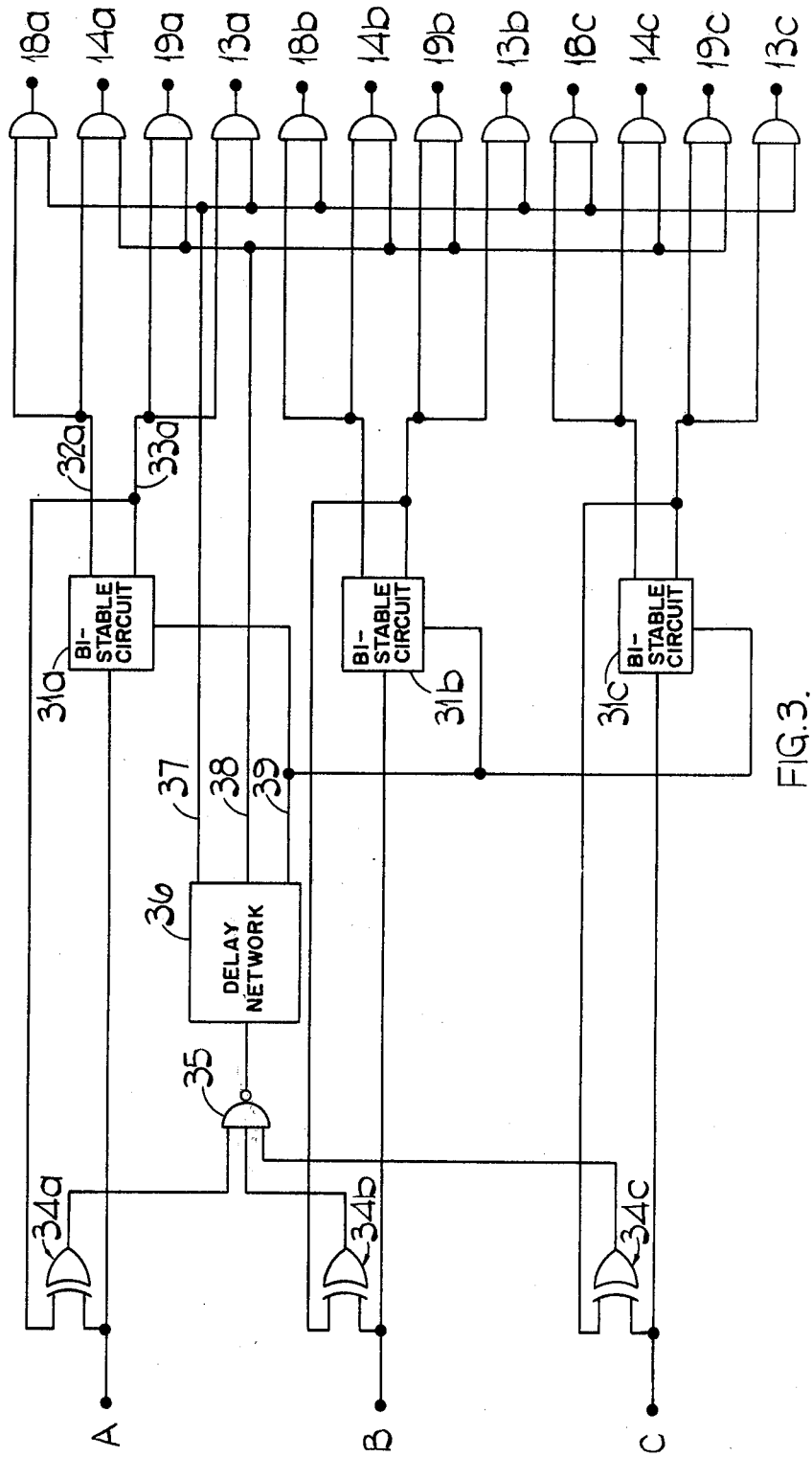

FIG. 3 shows the firing control circuit which has three input terminals A, B, C, to which the outputs shown in the Table above could be fed to operate the inverter in the required manner. For reasons which will become apparent later, the outputs are not fed directly to the terminals A, B, C, but for the moment it will be assumed that they are. FIG. 3 shows 12 AND gates which are associated with the 12 thyristors in the inverter respectively. Each of the AND gates will, on receipt of two inputs of logical level 1 produce an output for operating the firing circuit associated with its respective thyristor. It will be seen that the terminal A is connected to the input of a bistable circuit 31a having a first output line 32a connected to the gates associated with the thyristors 18a and 14a, and a second output line 33a connected to the gate associated with the thyristors 19a and 13a. In one state of the bistable circuit 31a, the lines 33a and 32a are at logical 1 and 0 respectively, and in the other state they are at logical 0 and 1 respectively. The terminal A is also connected to an exclusive OR gate 34a which receives an input from the line 33a and provides an output by way of a NAND gate 35 to a delay network 36 controlling the output on three lines 37, 38, 39. The line 37 provides inputs to the gates associated with thyristors 13a and 18a, and the line 38 provides inputs to the gates associated with the thyristors 14a and 19a. The terminal B and C have similar sets of components associated with them, indicated by the same reference numerals with the suffixes b and c respectively. The components 35, 36, 37 38 and 39 are common to all three phases, and it will be seen that the line 39 is connected to the bistable circuit 31a, 31b and 31c for a purpose to be described.

Considering the operation of phase A, then at a shaft angle of say 359° the lines 32a and 33a will be carrying signals 0 and 1 respectively, the lines 37 and 38 will be carrying signals 1 and the line 39 signals 0. It will be seen that in these circumstances the AND gates associated with thyristors 13a and 19a will be producing outputs as required. At the 360° point, the input at terminal A changes from 0 to 1 and so the two input signals to the gate 34a are different, and the gate 34a provides an input by way of the gate 35 to trigger the delay network 36. Triggering of the delay network 36 drives the lines 37 and 38 to binary 0 and the line 39 to binary 1, thereby triggering the bistable circuit 31a so that the line 33a carries the signal 0 and the line 32a carries the signal 1. The bistable circuits 31a, 31b and 31c are then inhibited. It will be seen that none of the AND gates associated with the thyristors 13a, 14a, 19a, 18a is now producing an output. However, at the end of the delay period D1 the signal 1 appears on line 37, so that the gate of thyristor 18a receives firing pulses. At time D2, a signal 1 also appears on the line 38 so that firing pulses are fed to the thyristor 14a. At time T3 the line 39 reverts to signal 0, and the gates 31a, 31b and 31c are still inhibited. The operation is similar for the other two phases and can readily be seen from FIG. 3 taken in conjunction with the Table indicating the signals which can be fed to terminals A, B and C in FIG. 3.

Figures 4, 5:
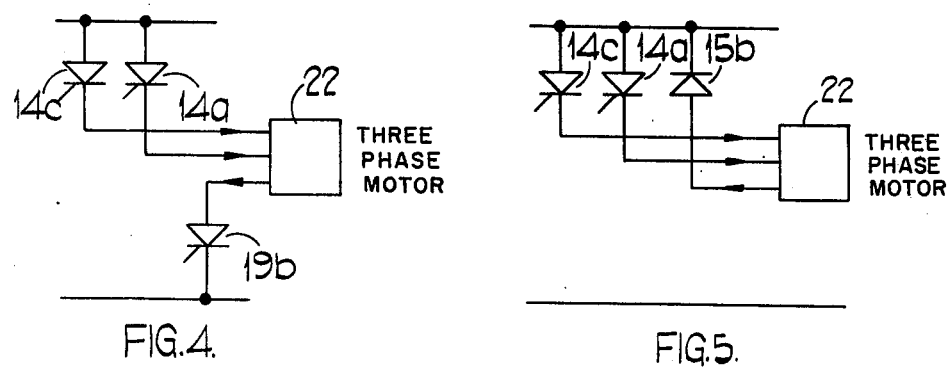
Figure 6:
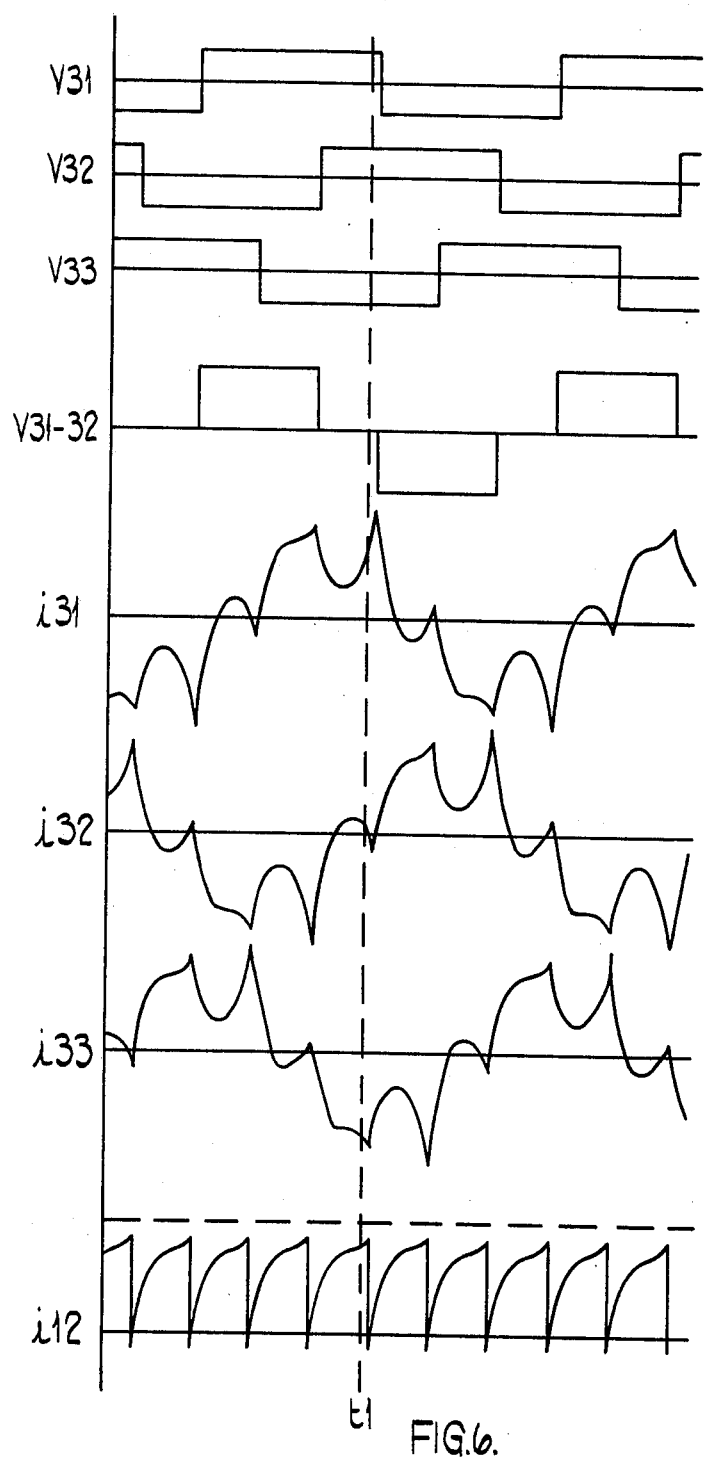

Whenever the current flowing through the device 23 is below a predetermined level, the operation will be exactly as described above, and the waveforms in the various parts of the circuit will be as shown in FIG. 6. There will in fact be six conductive patterns within the inverter during a cycle, and by way of example a typical conducting pattern at the time T1 indicated in FIG. 6 is shown in FIG. 4. Current flows to the motor through the thyristors 14a and 14c, the return path being provided by way of the thyristor 19b. The other five conducting paths can readily be identified, but for the purposes of explaining what happens when the current flowing in the device 23 exceeds the predetermined value, it is most convenient to consider simply the conducting paths shown in FIG. 4. If at any time the current flowing in the device 23 exceeds the predetermined value, then the thyristor 19b is turned off for a predetermined fixed period of time, and during this time the current flow in the device 23 will cease. This is achieved by the normal switching arrangements within the inverter itself. Thus, at the instant when the current in the device 23 exceeds the predetermined value, the thyristor 18b is fired, so that the thyristor 19b turns off. Shortly afterwards, the thyristor 14b is fired and the capacitor 17b completes its charging process by way of the thyristor 18b and the thyristor 14b or the diode 15b, after which the thyristor 18b turns off. The circuit then has the form shown in FIG. 5 with gate signals applied to the thyristor 14b even though the thyristor 14b is not conducting. The current flowing through the device 23 now ceases. Later, the thyristor 13b is fired and the capacitor 17b then discharges resonantly by way of the diode 15b. Shortly after the thyristor 19b is fired, and the capacitor 17b completes its charging process by way of the thyristors 13b and 19b. The circuit now has the form shown in FIG. 4 again, and if the current should rise above the predetermined level again, the circuit will revert to the condition shown in FIG. 5 for the fixed period of time. Similar switching action will occur in any of the six possible conducting patterns if the current in the device 23 exceeds the predetermined value.

Figure 7:
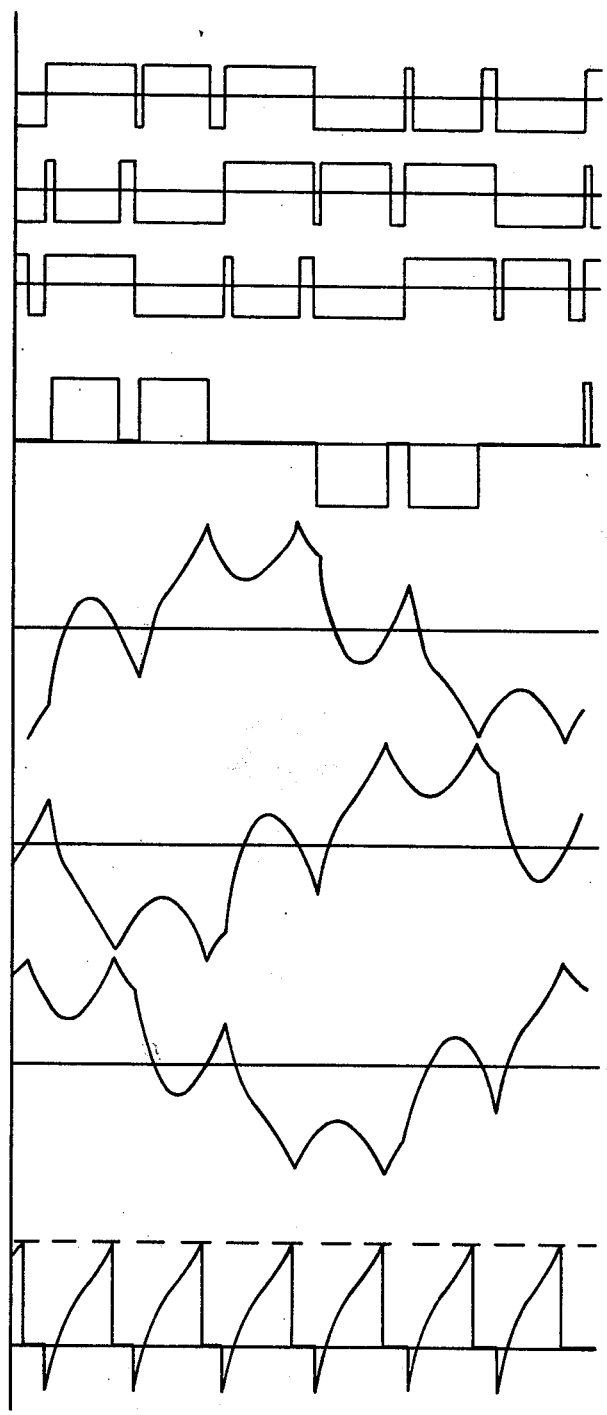
Figure 8:
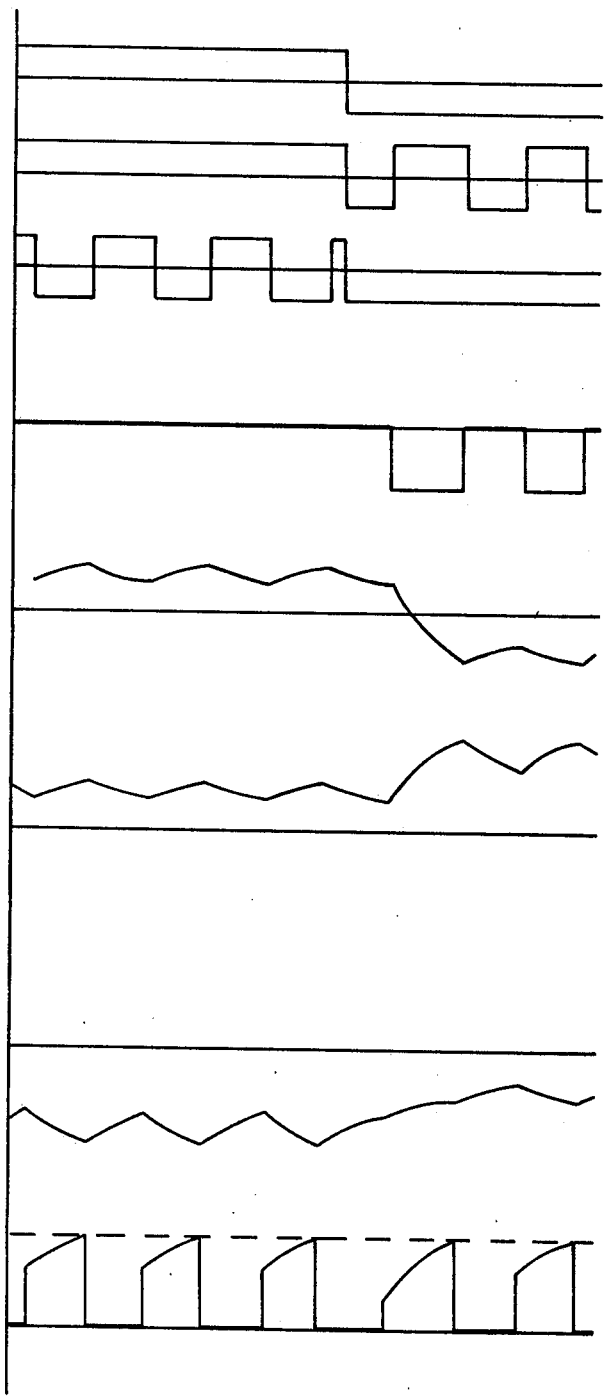

It will be seen that the switching action in FIG. 4 and FIG. 5 is exactly the same as the switching action when the inverter is operating normally. The way in whcih this is achieved will be described later, but for the moment reference should be directed again to FIG. 6. In FIG. 6, the first three waveforms show the voltages on the lines 31 to 33 feeding the load 22, the next waveform shows the voltage between the lines 31, 32, the next three waveforms show the current flowing in the three phases of the motor, and the last waveform represents the current in the line 12, which is below the predetermined limit, indicated by the dotted line. FIG. 7 is similar to FIG. 6 and shows what happens when the predetermined level is just reached, and FIG. 8 shows what happens when the current is endeavouring to exceed the predetermined level by a substantial amount.

In order to achieve the required operation of the inverter when the current exceeds the predetermined level, all that is required is to ensure that the signals at the terminals A, B, C in FIG. 3 are modified for the predetermined period of time so that the circuit operates as described with reference to FIGS. 4 and 5. A table has already been given showing what signals are required at the terminals A, B, C during normal operation, that is to say when the current is below the predetermined level. With the current above the predetermined level, then this Table can be modified to read as follows.

| SHAFT ANGLE | 0° | 60° | 120° | 180° | 240° | 300° | 360°(0°) |
|---|---|---|---|---|---|---|---|
| Phase A | 1 | 0 | 1 | 0 | 1 | 0 | |
| Phase B | 1 | 0 | 1 | 0 | 1 | 0 | |

| SHAFT ANGLE | 0° | 60° | 120° | 180° | 240° | 300° | 360°(0°) |
|---|---|---|---|---|---|---|---|
| Phase C | | 1 | 0 | 1 | 0 | 1 | 0 |

-continued

If a symbol I is defined such that I is 0 normally and 1 during the predetermined period of time, and the outputs from the three shaft encoders associated with the phases A, B and C respectively are denoted by the letters A, B and C, then the required input at terminal A in FIG. 3 can be expressed as follows:

Input A = $A.\bar{I} + A.\bar{B}.C.I + A.B.\bar{C}.I + \bar{A}.B.C.I$.

The first term in this equation represents the situation when the current is below the predetermined limit, because in this case the input to the terminal A is the same as the output from the relevant encoder. The other three terms are obtained by inspection from the two Tables. Thus, at for instance the 2° point the encoders produce signals 101 for phases A, B and C, and the required input as seen from the second Table is 111. The second term in the logical expression for input A indicates this state of affairs.

The expression for input A can be treated by normal mathematical techniques to produce the following result.

| Input A = | $A.\bar{I}$ | $\overline{A.C.I}$ | $\overline{A.B.I}$ | $\overline{C.B.I}$ |
|---|---|---|---|---|
| and similarly it can be shown that | | | | |
| Input B = and | $B.\bar{I}$ | $\overline{A.C.I}$ | $\overline{A.B.I}$ | $\overline{B.C.I}$ |
| Input C = | $C.\bar{I}$ | $\overline{A.C.I}$ | $\overline{A.B.I}$ | $\overline{B.C.I}$ |

Figure 9:
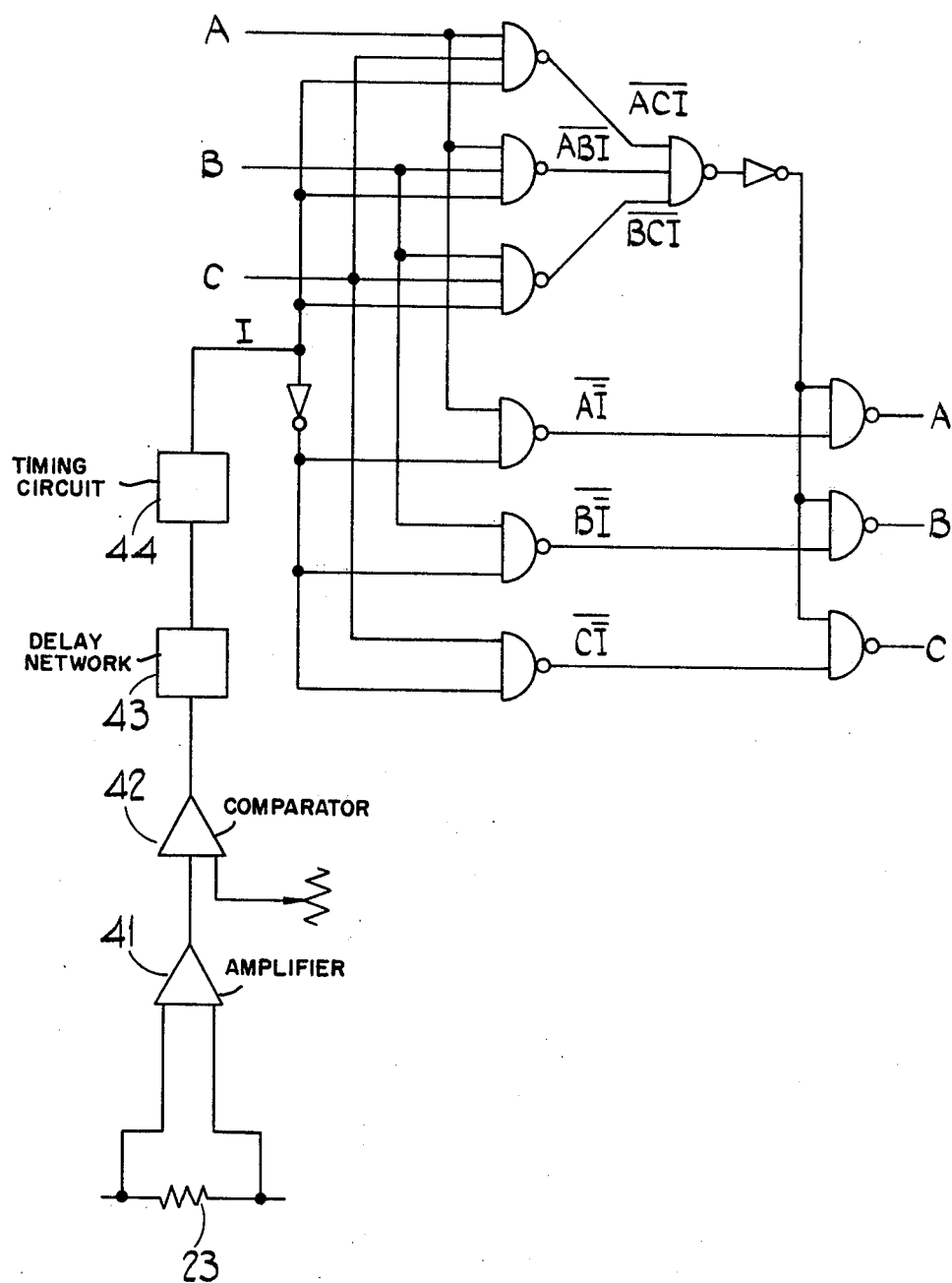

A simple arrangement for achieving this effect is shown in FIG. 9. The device 23 is a resistor the voltage across which is fed to an amplifier 41 the output from which is fed to a comparator 42 which senses the predetermined current level by comparison with a reference and then provides an input to a delay network 43 the purpose of which is to ensure that no regard is taken of very short current peaks above the predetermined level. The output from the delay network 43 is fed to a timing circuit 44 which provides an input to a logic network. The timing circuit 44 sets the time for which the inverter is driven from the condition of FIG. 4 (or an equivalent condition) to the condition of FIG. 5 (or an equivalent condition).

The logic network consists of ten NAND gates and two inverters. The input from the circuit 44 is fed to three of the NAND gates, and these gates also receive inputs from the shaft encoders to produce outputs in the required manner as indicated on the drawing. An inverted signal is fed to the other three NAND gates from the circuit 44 to produce the other three terms in the equation. The three output NAND gates combine the various terms as shown to provide the required inputs to the terminals A, B, C of FIG. 3.

Figure 11:
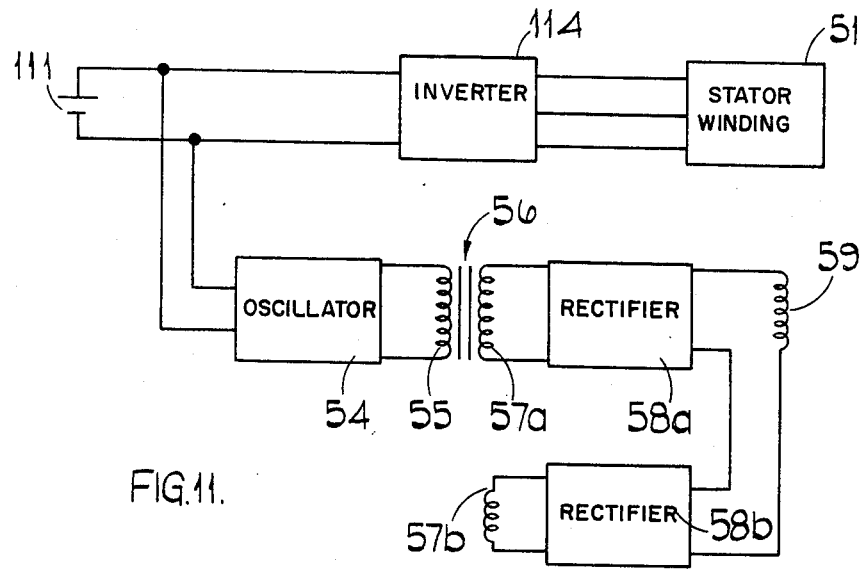
Figure 12:
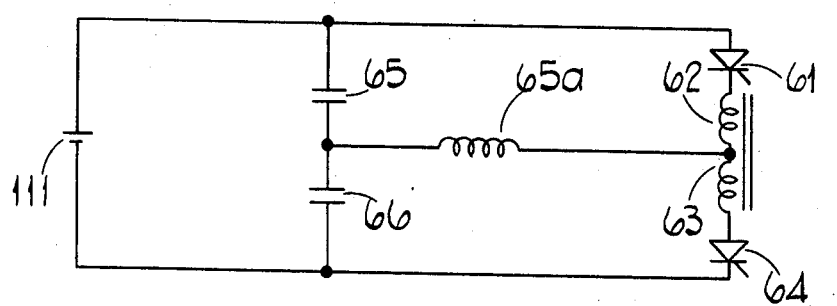
Figure 13:
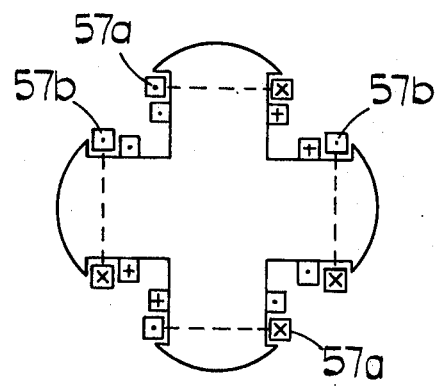
FIG. 13 illustrates one form of winding arrangement.

The preferred form of motor circuit is shown in FIGS. 11 to 13. The motor 22 includes a stator assembly having a three phase stator winding indicated at 51, this winding being fed through the inverter 114 from a battery 111 as described.

The battery 111 also provides power to an oscillator 54 which feeds the primary winding 55 of a transformer 16 having two secondary windings 57a, 57b with their axes electrically 90° apart, the secondary windings of the transformer providing inputs to a pair of rectifiers 58a, 58b which are connected either in parallel, or preferably in series as shown to a field winding 59 to the rotor assembly of the motor. The rectifiers 58a, 58b and secondary windings 57a, 57b are also on the rotor assembly, and the oscillator 54 and primary winding 55 are on the stator assembly. It will be noted that the field current in the winding 59 is independent of the angular position and the rotation of the rotor. This contributes to good starting performance.

The magnitude of the field current can be varied by controlling the frequency of the oscillator 54. A convenient form of oscillator for this purpose is shown in FIG. 12. The battery 111 has connected across it a series circuit including a thyristor 61, a pair of magnetically coupled windings 62, 63 and a thyristor 64. The junction of the windings 62, 63 is connected through the winding 65a to the junction of a pair of capacitors 65, 66 bridging the battery 111. The thyristors 61, 64 are fired in turn, and the capacitors 65, 66 serve to effect the required commutation of the thyristors 61, 64. The frequency of the oscillator is controlled by varying the instant at which gate pulses are applied to the thyristors 61, 64.

The transformer 56 could be a self-contained transformer having the primary winding 55 and part of the transformer core on the stator assembly, and the secondary windings 57a, 57b and the remainder of the core on the rotor assembly. However, it is preferred to incorporate the transformer within the motor itself, with the primary winding wound in the same stator slots as the stator winding, and the secondary winding wound on the rotor. Typically, the primary winding would occupy about 10% of the space in the stator slots. It is of course essential in such an arrangement to ensure that the transformer windings are not magnetically coupled to the main machine windings. This can be achieved by arranging that the number of poles produced by the main machine windings is either double or half the number of poles produced by the transformer windings. Using an arrangement as shown, a typical machine would have a three phase stator winding with four poles and a field winding 59 also with four poles, the field winding comprising a single coil on each pole as shown in FIG. 13. The primary winding would be a two pole single phase winding, and the two secondary windings would be wound as shown in FIG. 13.

Figures 14, 15:
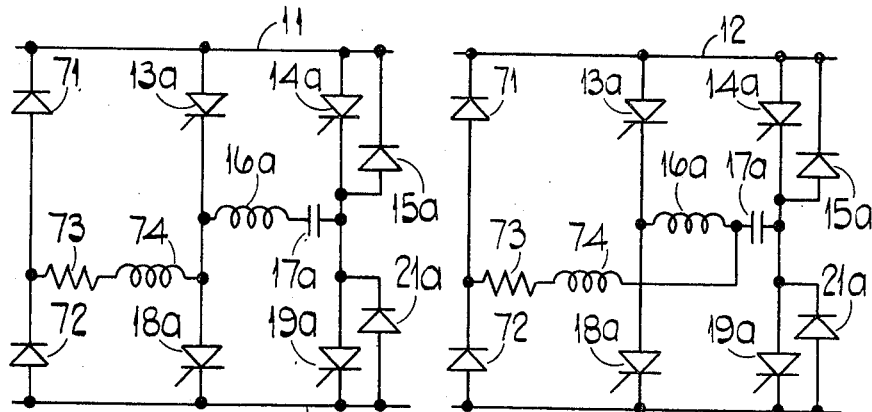
FIGS. 14 and 15 illustrate modifications of the commutation circuits.
Figure 16:
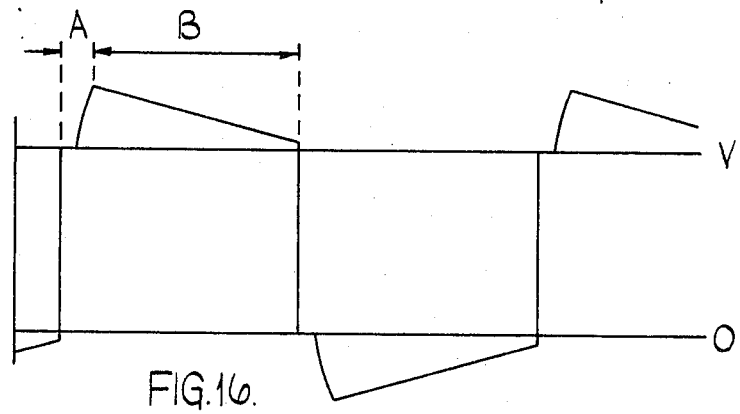
FIG. 16 shows a waveform associated with FIGS. 14 and 15.

Referring now to FIG. 14, there is shown for convenience one of the three commutation circuits of FIG. 1. In use, the capacitor 17a charges to a voltage above the voltage on the lines 11, 12 and this can be a disadvantage, because the thyristors and capacitor must be rated at this elevated voltage, and the full commutation ability of the circuit is not available when the circuit is first switched on. In order to overcome this problem, the oscillatory commutation circuit is over damped at the end of each commutation. This can be achieved in a number of ways, but in FIG. 14, the lines 11, 12 are interconnected through the cathode anode paths of a pair of diodes 71, 72 in series, the junction of the diodes 71, 72 being connected to the anode of the thyristor 18a through a resistor 73, and an inductor 74 in series. In many circuits the inductor 74 is not necessary, and FIG. 16 shows the waveform obtained with the arrangement of FIG. 14 where the inductor 26 is omitted. As will be seen in FIG. 16, during the commutation interval a the capacitor 17a charges to a voltage in excess of the supply voltage. During the interval b the over damping causes the capacitor voltage to reduce to a value in excess of the supply voltage by a chosen amount in a given time. It should be noted that it is extremely important that the oscillatory commutating circuit is over damped at the end of each commutation as distinct from being under damped. Under damping would cause an oscillatory discharge of the capacitor 17a during the period b and it would then be possible to trap on the capacitor 17a a charge at a voltage less than the supply voltage, which of course would means that the circuit could possibly fail to commutate.

The arrangement of FIG. 15 is similar to that of FIG. 14, the series circuit 73, 74 now being returned to the junction of the inductor 16a and capacitor 17a. The operation is unaffected.

Figure 17:
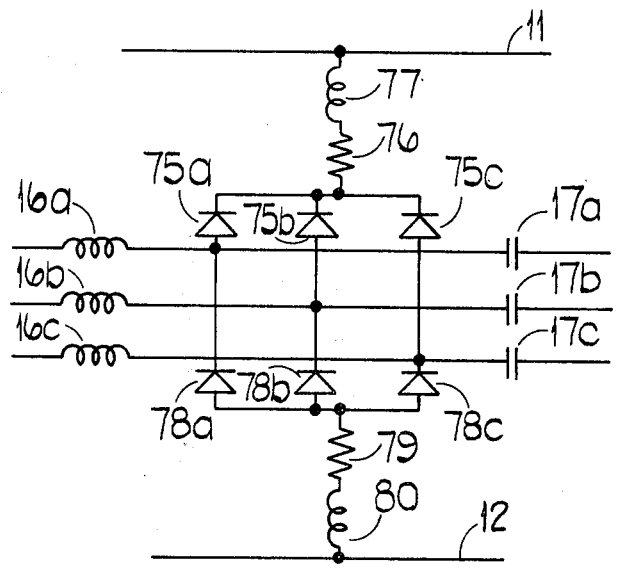
FIG. 17 is a fragmentary view showing a modification of FIG. 1.

The arrangements of FIGS. 14 and 15 can be duplicated for each of the three phases if desired, but it is possible to save components as indicated in FIG. 17, which shows a part only of the arrangement of FIG. 1. It will be seen that the junction of the winding 16a and capacitor 17a is connected to the anode of a diode 75a and the cathode of a diode 78a. The junction of the winding 16b and capacitor 17b is similarly connected to the anode of a diode 75b and the cathode of a diode 78b, whilst the junction of the winding 16c and capacitor 17c is connected to the anode of a diode 75c and the cathode of a diode 78c. The diode 75a, 75b, 75c have their cathodes connected to the line 11 through a resistor 76 and a winding 77 in series, and the anodes of the diodes 78a, 78b, 78c are connected to the line 12 through a resistor 79 and a winding 80 in series. The operation is exactly the same as FIG. 14 or FIG. 15, but it will be seen that one resistor and one winding have been saved.

An alternative connection comprises connecting the junctions of the pairs of diodes to the junctions of the pairs of first and third thyristors respectively.

We claim:

1. A drive system comprising in combination: an a.c. synchronous drive motor and an inverter circuit providing power to the motor, said inverter circuit receiving firing pulses under the control of the rotor of the motor, and said inverter circuit being capable of operating from a maximum frequency down to zero frequency, so that the motor operates synchronously from starting up to maximum speed, said motor being a brushless motor having a stator structure including a stator core mounting power windings the flow of current in which is controlled by said inverter circuit, a rotor structure, a field winding on the rotor structure, a rectifier assembly mounted on the rotor for supplying a unidirection current to the field winding, and transformer means including a primary winding and a secondary winding carried by the stator and rotor structures respectively, whereby alternating current can be supplied to said rectifier means, said stator core being provided with slots, a substantial proportion of said slots being occupied by said power windings, the remaining portion of said slots being occupied by the primary winding of said transformer means, said secondary winding comprising a pair of secondary windings electrically positioned 90° apart, said rectifier means comprising a pair of rectifier units supplying unidirectional current to said field winding.

2. A drive system as claimed in claim 1 in which the outputs of said rectifier units are connected in parallel.

3. A drive system as claimed in claim 1 in which the outputs of said rectifier units are connected in series.

4. A drive system as claimed in claim 1 in which the number of poles produced by said power windings is different to the number of poles produced by the transformer primary winding whereby interaction between the power windings and the transformer winding is minimised.

5. A drive system according to claim 1 including an oscillator for supplying alternating current to the primary winding of the transformer.

6. A drive system comprising in combination: an a.c. synchronous drive motor and an inverter circuit providing power to the motor, said inverter circuit receiving firing pulses under the control of the rotor of the motor, and said inverter circuit being capable of operating from a maximum frequency down to zero frequency, so that the motor operates synchronously from starting up to maximum speed, said inverter circuit including a plurality of thyristors, a firing network for firing the thyristors in a desired order and means for supplying to the firing network signals representing the position of the rotor of the motor, sensing means for sensing the magnitude of current flow in a d.c. supply lead to said inverter circuit, a logic network through which the signals provided by said means are passed to said firing network, said logic unit receiving a signal from said sensing means when the current flowing in said line exceeds a predetermined value, said logic unit acting to modify the signals supplied to the firing network whereby the current flowing in said line is reduced to zero, and a delay network interposed between said sensing means and said logic unit, said delay network acting to prevent modification of said signals during temporary increase of the current above said predetermined value.

7. A drive system as claimed in claim 6 including a timing network interposed between said delay network and said logic unit, said timing network acting to stop said signal reaching the logic unit after a predetermined time, whereby modification of said signals takes place for said predetermined time only.

* * * * *